(12) United States Patent
Lee

(10) Patent No.: US 12,540,221 B2
(45) Date of Patent: Feb. 3, 2026

(54) METHOD FOR MANUFACTURING LIQUID CRYSTAL POLYMER FILM

(71) Applicant: AZOTEK CO., LTD., Taoyuan (TW)

(72) Inventor: Hung-Jung Lee, Taoyuan (TW)

(73) Assignee: AZOTEK CO., LTD., Taoyuan (TW)

( * ) Notice: Subject to any disclaimer, the term of this patent is extended or adjusted under 35 U.S.C. 154(b) by 277 days.

(21) Appl. No.: 18/335,155

(22) Filed: Jun. 15, 2023

(65) Prior Publication Data

US 2024/0141119 A1    May 2, 2024

Related U.S. Application Data

(60) Provisional application No. 63/379,903, filed on Oct. 18, 2022.

(30) Foreign Application Priority Data

Apr. 11, 2023   (TW) ................. 112113510

(51) Int. Cl.
*C08J 5/18*      (2006.01)
*B29C 48/00*      (2019.01)
*B29C 48/08*      (2019.01)
*B29C 48/91*      (2019.01)
(Continued)

(52) U.S. Cl.
CPC ............... *C08J 5/18* (2013.01); *B29C 48/022* (2019.02); *B29C 48/91* (2019.02); *B29C 48/08* (2019.02); *B29K 2067/00* (2013.01); *B29K 2105/0079* (2013.01); *B29K 2105/0085* (2013.01); *C08J 2367/03* (2013.01); *C08J 2367/04* (2013.01)

(58) Field of Classification Search
CPC .......... C08J 5/18; B29C 48/022; B29C 48/91; B29C 48/08
See application file for complete search history.

(56) References Cited

U.S. PATENT DOCUMENTS 6,090,898 A * 7/2000 Tsunekawa ................ C08J 5/18
                                                       428/338
2015/0017413 A1* 1/2015 Konno .................. B29C 55/143
                                                       264/234
(Continued)

FOREIGN PATENT DOCUMENTS

| CN | 110181829 A | 8/2019 |
|----|-------------|--------|
| CN | 110776928 A | 2/2020 |
| JP | 6-331826 A | 12/1994 |

(Continued)

*Primary Examiner* — Michael M. Robinson
(74) *Attorney, Agent, or Firm* — CKC & Partners Co., LLC

(57) ABSTRACT

A method for manufacturing a liquid crystal polymer film includes the following operations. Liquid crystal oligomers are received, in which the liquid crystal oligomers have a melting point of $T_{m1}$ and has an average degree of polymerization of 10 to 100. A first heating process is performed to melt the liquid crystal oligomers, in which the first heating process has a first heating temperature higher than the $T_{m1}$. An extrusion process is performed to make the liquid crystal oligomers into a first film. A second heating process with a second heating temperature is performed to heat the first film, in which the liquid crystal oligomers in the first film are polymerized to form a second film including liquid crystal polymers.

20 Claims, 1 Drawing Sheet

(51) Int. Cl.
*B29K 67/00* (2006.01)
*B29K 105/00* (2006.01)

(56) References Cited

U.S. PATENT DOCUMENTS

2022/0315751 A1\* 10/2022 Konishi ..................... C08J 5/18
2023/0203376 A1\* 6/2023 Kono ....................... H05K 1/03
                                                                    252/299.1

FOREIGN PATENT DOCUMENTS

| | | | |
|---|---|---|---|
| JP | 2000-44797 | A | 2/2000 |
| JP | 2003-207644 | A | 7/2003 |
| JP | 2019-136693 | A | 8/2019 |
| KR | 10-1994-0011369 | B | 12/1994 |
| TW | 202229426 | A | 8/2022 |
| WO | 2013146174 | A1 | 10/2013 |
| WO | 2016174868 | A1 | 11/2016 |

\* cited by examiner

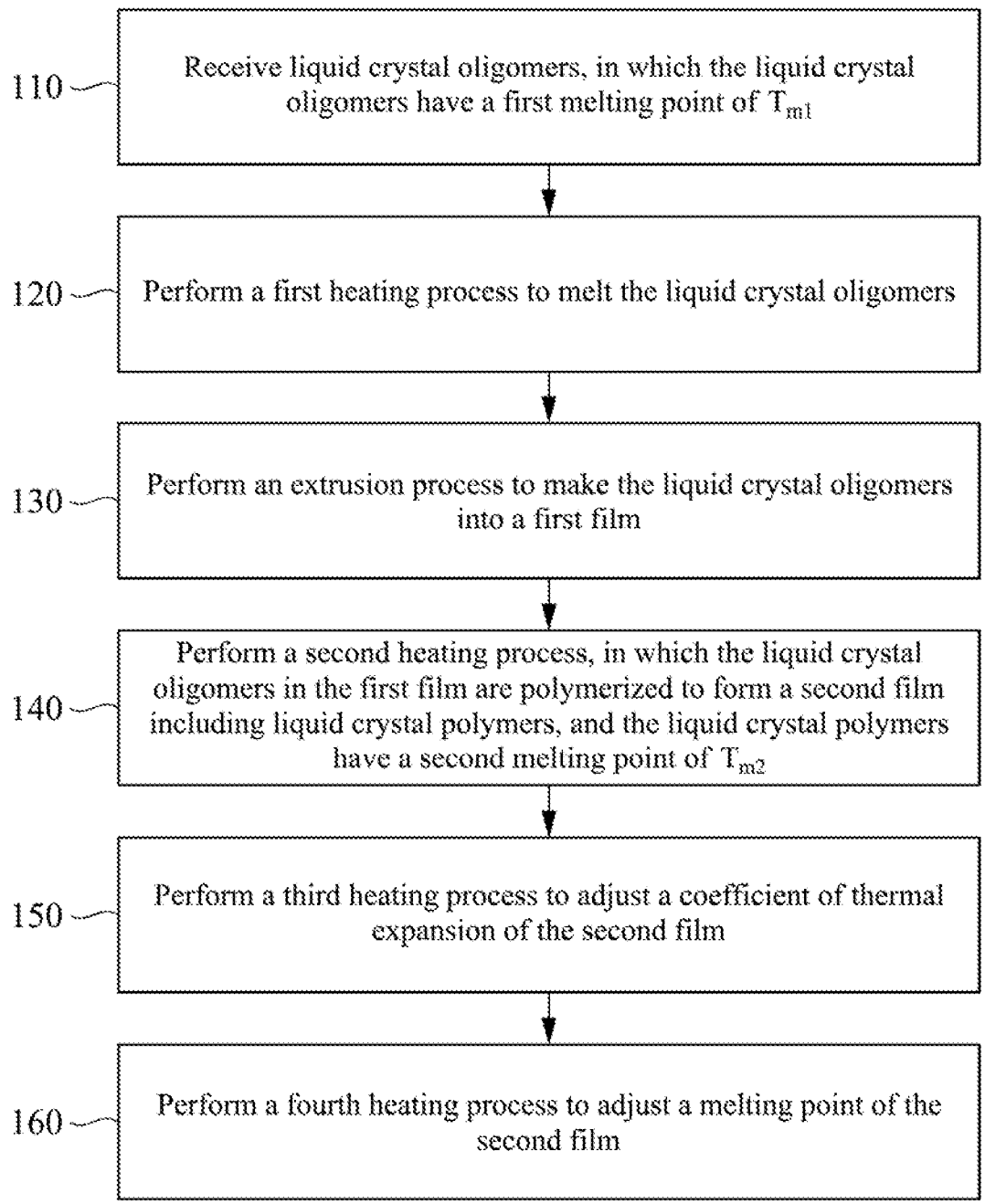

METHOD FOR MANUFACTURING LIQUID CRYSTAL POLYMER FILM

CROSS-REFERENCE TO RELATED APPLICATION

This application claims priority to U.S. Provisional Application Ser. No. 63/379,903 filed Oct. 18, 2022, and Taiwan Application Serial Number 112113510, filed Apr. 11, 2023, the disclosures of which are incorporated herein by reference in their entireties.

BACKGROUND

Field of Invention

The present disclosure relates to a method for manufacturing a liquid crystal polymer film. More particularly, the present disclosure relates to a method for manufacturing a liquid crystal polymer film by using liquid crystal oligomers.

Description of Related Art

Liquid crystal polymer films have excellent low moisture absorption, heat resistance, chemical reagent resistance, and dielectric properties. Using the liquid crystal polymer films as dielectric layers of circuit boards can reduce the adverse effects of resistance-capacitance delay (RC delay). However, there may be a problem of uneven film thickness in the production of liquid crystal polymer films. Therefore, there is an urgent need to develop a manufacturing method for liquid crystal polymer films to solve these problems.

SUMMARY

The present disclosure provides a method for manufacturing a liquid crystal polymer film, and the method includes the following operations. Liquid crystal oligomers are received, in which the liquid crystal oligomers have a first melting point of $T_{m1}$ and have an average degree of polymerization of 10 to 100. A first heating process is performed to melt the liquid crystal oligomers, in which the first heating process has a first heating temperature higher than $T_{m1}$. An extrusion process is performed to make the liquid crystal oligomers into a first film. A second heating process with a second heating temperature is performed to heat the first film, in which the liquid crystal oligomers in the first film are polymerized to form a second film including liquid crystal polymers.

In some embodiments, the second heating temperature of the second heating process is $T_{m1}-30°$ C. to $T_{m1}+10°$ C.

In some embodiments, the second heating process has a heating time of 1 hour to 60 hours.

In some embodiments, the second heating process has a heating rate of 0.1° C./min to 200° C./min.

In some embodiments, the method further includes performing a third heating process to heat the second film, in which the liquid crystal polymers have a second melting point of $T_{m2}$, the liquid crystal polymers have a glass transition temperature of $T_g$, and the third heating process has a third heating temperature of $T_g$ to $T_{m2}$.

In some embodiments, the third heating process has a heating time of 1 minute to 180 minutes.

In some embodiments, the method further includes after performing the third heating process to heat the second film, a fourth heating process is performed to heat the second film, in which the fourth heating process has a fourth heating temperature of $T_{m2}-40°$ C. to $T_{m2}$.

In some embodiments, the fourth heating process has a heating rate of 0.1° C./minute to 30° C./minute.

In some embodiments, the fourth heating process has a heating time of 10 minutes to 900 minutes.

In some embodiments, a heating rate of the third heating process is higher than a heating rate of the fourth heating process.

In some embodiments, the extrusion process has an extrusion temperature between the first heating temperature of the first heating process and the $T_{m1}$.

In some embodiments, the liquid crystal oligomers are thermotropic liquid crystal oligomers.

In some embodiments, the liquid crystal oligomers are synthesized from a composition including at least one of aromatic dicarboxylic acids and alicyclic dicarboxylic acids and at least one of aromatic diols, alicyclic diols, and aliphatic diols.

In some embodiments, the liquid crystal oligomers are synthesized from a composition including at least one of aromatic hydroxycarboxylic acids.

In some embodiments, the liquid crystal oligomers are synthesized from a composition including at least one of aromatic dicarboxylic acids and alicyclic dicarboxylic acids, at least one of aromatic diols, alicyclic diols, and aliphatic diols, and at least one of aromatic hydroxycarboxylic acids.

BRIEF DESCRIPTION OF THE DRAWINGS

The present disclosure can be more fully understood by reading the following detailed description of the embodiments, with reference to the accompanying drawings.

The single FIGURE is a flow chart of a method for manufacturing a liquid crystal polymer film according to various embodiments of the present disclosure.

DETAILED DESCRIPTION

The following embodiments are disclosed with accompanying diagrams for a detailed description. For illustration clarity, many details of practice are explained in the following descriptions. However, it should be understood that these details of practice do not intend to limit the present disclosure. That is, these details of practice are not necessary for parts of embodiments of the present disclosure.

Although a series of operations or steps are used below to describe the method disclosed herein, an order of these operations or steps should not be construed as a limitation to the present disclosure. For example, some operations or steps may be performed in a different order, and/or other steps may be performed at the same time. In addition, it is not necessary to perform all of the operations, steps, and/or features shown to achieve the embodiments of the present disclosure. In addition, each operation or step described herein may contain several sub-steps or actions.

The present disclosure provides a method for manufacturing a liquid crystal polymer film. Referring to the FIGURE, the FIGURE is a flow chart of a method for manufacturing a liquid crystal polymer film according to various embodiments of the present disclosure. A method 100 includes operation 110, operation 120, operation 130, operation 140, operation 150, and operation 160.

In operation 110, liquid crystal oligomers are received, in which the liquid crystal oligomers have a first melting point of $T_{m1}$. The liquid crystal oligomers have an average degree of polymerization of 10 to 100, such as 10, 20, 30, 40, 50, 60, 70, 80, 90, or 100. The average degree of polymerization is the average of the number of repeating units contained in the molecular chains of the liquid crystal oligomers. In some embodiments, the liquid crystal oligomers are synthesized from monomers used to prepare thermotropic liquid crystal polymers, so the liquid crystal oligomers may also be referred to as thermotropic liquid crystal oligomers. In the subsequent process, the thermotropic liquid crystal polymers are synthesized from the liquid crystal oligomers. In some embodiments, the liquid crystal oligomers have a weight average molecular weight of 2900 to 44000, such as 2900, 3000, 4000, 5000, 6000, 7000, 8000, 9000, 10000, 12000, 14000, 16000, 18000, 20000, 22000, 24000, 26000 28000, 30000, 32000, 34000, 36000, 38000, 40000, 42000, or 44000.

In some embodiments, the compositions for synthesizing thermotropic liquid crystal oligomers include component (1), component (2), and component (3). Component (1) is at least one of aromatic dicarboxylic acids and alicyclic dicarboxylic acids. Component (2) is at least one of aromatic diols, alicyclic diols, and aliphatic diols. Component (3) is at least one of aromatic hydroxycarboxylic acids. The thermotropic liquid crystal oligomers can be synthesized from any of the following compositions (A) to (C). Composition (A) includes component (1) and component (2). For example, the aromatic dicarboxylic acids and component (2) may be used to prepare aromatic polyester type thermotropic liquid crystal oligomers. For example, component (1) and the aromatic diols may be used to prepare aromatic polyester type thermotropic liquid crystal oligomers. Composition (B) includes component (3) and may be used to prepare aromatic polyester type thermotropic liquid crystal oligomers. Composition (C) includes components (1), (2), and (3) and may be used to prepare aromatic polyester type thermotropic liquid crystal oligomers.

For example, the aromatic dicarboxylic acids may include terephthalic acid (TA), 4,4'-diphenyldicarboxylic acid, 4,4'-triphenyldicarboxylic acid, 2,6-naphthalenedicarboxylic acid, diphenyl ether-4,4'-dicarboxylic acid, diphenoxyethane-4,4'-dicarboxylic acid, diphenoxybutane-4,4'-dicarboxylic acid, isophthalic acid, diphenyl ether-3,3'-dicarboxylic acid, naphthalene-1,6-dicarboxylic acid, derivatives of the above compounds, or combinations thereof. The derivatives are, for example, chloroterephthalic acid, dichloroterephthalic acid, bromoterephthalic acid, methylterephthatic acid, dimethylterephthalic acid, ethylterephthalic acid, methoxyterephthalic acid, or ethoxyterephthalic acid. For example, the aliphatic dicarboxylic acids may include trans-1,4-cyclohexanedicarboxylic acid, cis-1,4-cyclohexanedicarboxylic acid, 1,3-cyclohexanedicarboxylic acid, or combinations thereof.

For example, the aromatic diols may include 4,4'-biphenol, hydroquinone, resorcinol, 4,4'-dihydroxydiphenyl, 4-4'-dihydroxytriphenyl, 2,6-naphthalenediol, 4,4'-dihydroxydiphenyl ether, bis(4-hydroxyphenoxy)ethane, 3,3'-dihydroxydiphenyl ether, 1,6-naphthalenediol, 2,2-bis(4-hydroxyphenyl)propane, 1,1-bis(4-hydroxyphenyl)methane, or combinations thereof. For example, the alicyclic diols may include trans-1,4-cyclohexanediol, cis-1,4-cyclohexanediol, trans-1,4-cyclohexanedimethanol, trans-1,3-cyclohexanediol, cis-1,2-cyclohexanediol, trans-1,3-cyclohexanedimethanol, or combinations thereof. For example, the aliphatic diols may include straight-chain and branched aliphatic diols, such as ethylene glycol, 1,3-propanediol, 1,4-butanediol, neopentyl glycol, or combinations thereof.

For example, the aromatic hydroxycarboxylic acids may include p-hydroxybenzoic acid (HBA), 3-hydroxybenzoic acid, 6-hydroxy-2-naphthoic acid, 6-hydroxy-1-naphthoic acid, derivatives of the above compounds, or combinations thereof. The derivatives are, for example, 3-methyl-4-hydroxybenzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, 6-hydroxy-5-methyl-2-naphthoic acid, 6-hydroxy-5-methoxy-2-naphthoic acid, 3-chloro-4-hydroxybenzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid, 6-hydroxy-5,7-dichloro-2-naphthoic acid, or combinations thereof.

For example, the thermotropic liquid crystal polymers include type I (high heat resistance type), type II (medium heat resistance type), and type III (low heat resistance type) polymers. (1) The high heat resistance type thermotropic liquid crystal polymers have a liquid crystal transition (LC transition) temperature of greater than about 330° C. The high heat resistance type thermotropic liquid crystal polymers have high tensile strength and high elastic modulus, and are chemically resistant to corrosion. The high heat resistance type thermotropic liquid crystal polymers are suitable for environments requiring high temperature performance, but it has slightly poor processing performance. (2) The medium heat resistance type thermotropic liquid crystal polymers have a liquid crystal transition temperature ranging from about 280° C. to about 320° C. The medium heat resistance type thermotropic liquid crystal polymers are chemically resistant to corrosion and hydrolytically stable. Moreover, it has excellent electrical and flame retardant properties, as well as strong impermeability and better overall performance. (3) The low heat resistance type thermotropic liquid crystal polymers have a liquid crystal transition temperature less than about 240° C. The low heat resistance type thermotropic liquid crystal polymers are slightly less heat resistant, but has good processability and low cost. It should be noted that the liquid crystal transition temperature is a specific temperature at which the thermotropic liquid crystal polymer resins change from a solid state to a liquid crystal state in a heated state. It is understood that different types of thermotropic liquid crystal polymers have different liquid crystal transition temperatures depending on their monomer structure.

In some embodiments, the liquid crystal oligomers are synthesized from p-hydroxybenzoic acid (HBA), terephthalic acid (TA), and 4,4'-biphenol. The liquid crystal oligomers have repeating units with the following formula (1), and the number of the repeating units ranges, for example, from 10 to 100. The liquid crystal oligomers can be used to synthesize high heat resistance type thermotropic liquid crystal polymers commercially available under the name Xydar®.

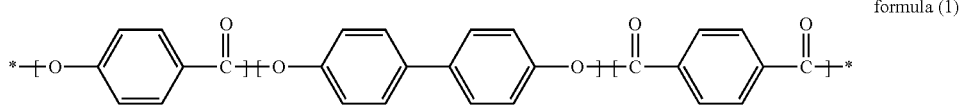

formula (1)

In some embodiments, the liquid crystal oligomers are synthesized from p-hydroxybenzoic acid (HBA) and 6-hydroxy-2-naphthoic acid (HNA). The liquid crystal oligomers have repeating units with the following formula (2), and the number of the repeating units ranges, for example, from 10 to 100. The liquid crystal oligomers can be used to synthesize medium heat resistance type thermotropic liquid crystal polymers commercially available under the name Vectra®.

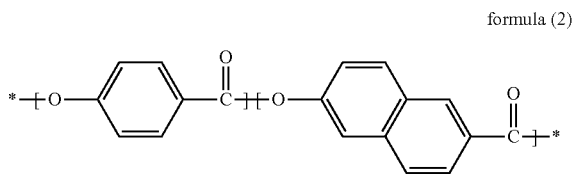

formula (2)

In some embodiments, the liquid crystal oligomers are synthesized from terephthalic acid (TA), ethylene glycol, and p-hydroxybenzoic acid (HBA). The liquid crystal oligomers have repeating units with the following formula (3), and the number of the repeating units ranges, for example, from 10 to 100. The liquid crystal oligomers can be used to synthesize low heat resistance type thermotropic liquid crystal polymers commercially available under the name $X_7G$®.

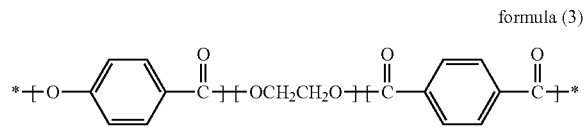

formula (3)

In operation 120, a first heating process is performed to melt the liquid crystal oligomers. The first heating process has a first heating temperature higher than $T_{m1}$. In some embodiments, the difference between the first heating temperature of the first heating process and $T_{m1}$ is less than or equal to 10° C. The difference is, for example, 1, 2, 3, 4, 5, 6, 7, 8, 9, or 10° C.

In operation 130, an extrusion process is performed to make the liquid crystal oligomers into a first film. In some embodiments, the extrusion process has an extrusion temperature between the first heating temperature of the first heating process and $T_{m1}$. It should be noted that, in general, compared to liquid crystal polymers, liquid crystal oligomers have a narrower molecular weight distribution. If the liquid crystal polymers are directly fabricated into a film by an extrusion process, it is not easy to control the film thickness and uniformity because the liquid crystal polymers have a wider range of molecular weight distribution. When the liquid crystal oligomers of the present disclosure are fabricated into the first film by the extrusion process, it is easier to control the extrusion temperature to adjust the film thickness and uniformity of the first film. The average degree of polymerization of the liquid crystal oligomers is from 10 to 100, and the smaller the average degree of polymerization, the narrower the molecular weight distribution of the liquid crystal oligomers. Therefore, it is easier to control the film thickness and uniformity of the first film.

In operation 140, a second heating process is performed, in which the liquid crystal oligomers in the first film are polymerized to form a second film including liquid crystal polymers having a second melting point of $T_{m2}$. In some embodiments, the second heating process has a second heating temperature of $T_{m1}-30°$ C. to $T_{m1}+10°$ C. The second heating temperature is, for example, $T_{m1}-30$, $T_{m1}-25$, $T_{m1}-20$, $T_{m1}-15$, $T_{m1}-10$, $T_{m1}-5$, $T_{m1}$, $T_{m1}+5$, or $T_{m1}+10°$ C. If the second heating temperature is lower than $T_{m1}-30°$ C. or higher than $T_{m1}+10°$ C., it may have adverse effects on the appearance, thickness, mechanical properties, thermal properties, or electrical properties of the second film. For example, if the second heating temperature is higher than $T_{m1}+10°$ C., the thickness of the second film may vary and cannot be maintained at the target thickness. In some embodiments, the heating time of the second heating process is longer than the extrusion time of the extrusion process in operation 130, so that the liquid crystal oligomers have enough time for the polymerization reaction. After the polymerization reaction, the second film may have a mechanical strength higher than that of the first film. In some embodiments, the heating time of the second heating process is 1 hour to 60 hours. The heating time is, for example, 1, 5, 10, 15, 20, 25, 30, 35, 40, 45, 50, 55, or 60 hours. If the heating time is less than 1 hour, the liquid crystal oligomers may not react completely. In other words, the liquid crystal polymers cannot be formed enough, and therefore the physical properties of the second film may be affected. If the heating time is longer than 60 hours, it may have adverse effects on the appearance, thickness, mechanical properties, thermal properties, or electrical properties of the second film. For example, the mechanical strength of the second film may decrease. When several second films are laminated, there may be a problem of poor bonding. In some embodiments, the heating rate of the second heating process is 0.1° C./min to 200° C./min. The heating rate is, for example, 0.1, 0.5, 1, 5, 10, 20, 40, 60, 80, 100, 120, 140, 160, 180, or 200° C./min. The heating rate may affect the physical properties of the second film. If the heating rate is lower than 0.1° C./min, the melting point of the second film may be too high, and the second film cannot have a target melting point. In some embodiments, operation 140 is performed under an inert environment. For example, the inert gas in the inert environment is nitrogen, argon, or a combination thereof.

In operation 150, a third heating process is performed to adjust the coefficient of thermal expansion (CTE) of the second film. In more detail, the third heating process is performed to heat the second film, in which the liquid crystal polymers have the second melting point of $T_{m2}$, the liquid crystal polymers have the glass transition temperature of $T_g$, and the third heating temperature of the third heating process is $T_g$ to $T_{m2}$. During the third heating process, the polymers within the second film are rearranged, such that the coefficient of thermal expansion (CTE) of the second film can be adjusted to about 17 ppm/° C. to 20 ppm/° C., such as 17, 18, 19, or 20 ppm/° C. The second film of the present disclosure, namely the liquid crystal polymer film, can be used as a dielectric layer for circuit boards. Generally, conductive elements in a circuit board are made of copper, and the CTE of copper is in the range of about 16.5 ppm/° C. to about 18 ppm/° C. Since the CTE of the second thin film of the present disclosure can be made to fall within the range of 17 ppm/° C. to 20 ppm/° C. by operation 150, the second film and a copper conductive element embedded in the second film can have similar CTEs, so that the two are not easy to peel off. In some embodiments, the third heating process has a heating time of 1 minute to 120 minutes. The heating time is, for example, 1, 5, 10, 20, 30, 40, 50, 60, 70, 80, 90, 100, 110, or 120 minutes. In some embodiments, the third heating process has a heating rate of 20° C./min to 200° C./min, such as 20, 30, 40, 50, 60, 70, 80, 90, 100, 110, 120, 130, 140, 150, 160, 170, 180, 190, or 200° C./min. In some embodiments, operation 150 is performed under an inert environment. For example, the inert gas in the inert environment is nitrogen, argon, or a combination thereof.

In operation 160, a fourth heating process is performed to adjust the melting point of the second film. In some embodiments, the fourth heating process is performed to heat the second film, and the fourth heating process has a fourth heating temperature of $T_{m2}-40°$ C. to $T_{m2}$. The fourth heating temperature is, for example, $T_{m2}-40$, $T_{m2}-35$, $T_{m2}-30$, $T_{m2}-25$, $T_{m2}-20$, $T_{m2}-15$, $T_{m2}-10$, $T_{m2}-5$, or $T_{m2}$ ° C. During the fourth heating process, the polymers in the second film are rearranged, so that the polymers are arranged more neatly. Moreover, the molecular weight of the polymers increases. Therefore, the melting point of the second film processed by the fourth heating process increases. Raising the melting point can make the second film have better heat resistance. When laminating several layers of the second film to form a laminate, the raising of the melting point can make the laminating quality better. For example, before performing operation 160, the melting point of the second film is 230° C. to 330° C., and the melting point of the second film can be adjusted to fall within the range of 280° C. to 350° C. by operation 160. The melting point of the second film after performing operation 160 is higher than the melting point of the second film before performing operation 160. The heating rate of the third heating process is higher than the heating rate of the fourth heating process. In some embodiments, the heating rate of the fourth heating process is 0.1° C./min to 30° C./min. The heating rate is, for example, 0.1, 0.5, 1, 5, 10, 15, 20, 25, or 30° C./min. In some embodiments, the heating time of the fourth heating process is 10 minutes to 900 minutes. The heating time is, for example, 10, 20, 40, 60, 80, 100, 200, 300, 400, 500, 600, 700, 800, or 900 minutes. In some embodiments, operation 160 is performed under an inert environment. For example, the inert gas in the inert environment is nitrogen, argon, or a combination thereof.

The liquid crystal polymer film prepared by the method of the present disclosure may have the following advantages. (1) Several layers of liquid crystal polymer film of the present disclosure can be laminated to form a laminate. When the lamination temperature increases, the lamination quality of the laminate also increases accordingly. These liquid crystal polymer films in the laminate are not easy to peel off. (2) Holes can be formed in the laminate by etching and then filled with a conductive layer. Generally, after etching, the liquid crystal polymers may form scum remaining on the hole walls, so wet etching (desmear process) is required to remove the scum. However, the chemicals used in the wet etching may etch back the hole walls, so after a conductive layer is filled into the holes, gaps may form between the hole walls and the conductive layer, which adversely affects the reliability of the overall structure. However, the laminate formed by the liquid crystal polymer film of the present disclosure has better etching resistance, and the hole walls are not easily etched back during wet etching. Therefore, after the conductive layer is filled into the holes, there is no gap between the hole walls and the conductive layer, and therefore the laminate has good reliability.

The following describes the features of the present disclosure more specifically with reference to the experiment. Although the following embodiments are described, the materials, their amounts and ratios, processing details, processing procedures, etc., may be appropriately varied without exceeding the scope of the present disclosure. Accordingly, this disclosure should not be interpreted restrictively by the embodiments described below.

Experiment: Manufacture of Liquid Crystal Polymer Film

A first film including an aromatic polyester type liquid crystal oligomers was received, and the liquid crystal oligomers have a first melting point of 240° C. A heating process with a heating temperature of 235° C. was performed to polymerize the liquid crystal oligomers to form a second film including liquid crystal polymers with a second melting point of 260° C. Next, the CTEs of several second films with different film thicknesses were measured in the range of 100° C. to 200° C., along the machine direction (MD) and transverse direction (TD). The CTE distribution range of these second films could be obtained. The measurement results are shown in CTE (MD) and CTE (CD) in Table 1 below. Next, a heating process with a heating temperature of 255° C. and a heating time of 5 minutes was performed to adjust the CTEs of the second films of Example 1 and Example 2, and the results are shown in the adjusted CTE (MD) and adjusted CTE (CD) in Table 1 below.

TABLE 1

| | Film thickness (um) | CTE (MD) (ppm/° C.) | CTE (CD) (ppm/° C.) | Adjusted CTE (MD) (ppm/° C.) | Adjusted CTE (CD) (ppm/° C.) |
|---|---|---|---|---|---|
| Example 1 | 50 | −30 to 10 | −20 to 30 | 18 to 19 | 18 to 19 |
| Example 2 | 25 | −30 to 10 | 10 to 80 | 18 to 19 | 18 o 19 |

Next, the melting points of the second films of Example 1 were adjusted by heating processes to obtain the melting points listed in Example 3 to Example 6 in Table 2 below. The heating rate of the heating processes was 5° C./min, and the heating time of the heating processes was 800 minutes. Please refer to the following Table 2 for the heating temperatures of Example 3 to Example 6.

TABLE 2

| | Heating temperature | Melting point before adjustment (° C.) | Melting point after adjustment (° C.) |
|---|---|---|---|
| Example 3 | 220 | 260 | 280 |
| Example 4 | 230 | 260 | 300 |
| Example 5 | 240 | 260 | 330 |
| Example 6 | 250 | 260 | 350 |

In summary, the present disclosure provides the method for manufacturing the liquid crystal polymer film. The extrusion process is performed to make the liquid crystal oligomers into a film, and then the liquid crystal oligomers in the film is polymerized by a heating process to form the liquid crystal polymer film. Compared to liquid crystal polymers, the liquid crystal oligomers have a narrower molecular weight distribution range, so it is easier to control the extrusion temperature during the extrusion process to adjust the film thickness and the film uniformity. Therefore, the liquid crystal polymer film made by the method of the present disclosure has better quality and is less likely to peel off when several layers of the liquid crystal polymer film are laminated together to form a laminate. Moreover, the liquid crystal polymer film of the present disclosure has better resistance to wet etching.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for manufacturing a liquid crystal polymer film, comprising:
   receiving liquid crystal oligomers, wherein the liquid crystal oligomers have a first melting point of $T_{m1}$ and have an average degree of polymerization of 10 to 100;
   performing a first heating process to melt the liquid crystal oligomers, wherein the first heating process has a first heating temperature higher than $T_{m1}$;
   performing an extrusion process to make the liquid crystal oligomers into a first film;
   performing a second heating process with a second heating temperature to heat the first film, wherein the liquid crystal oligomers in the first film are polymerized to form a second film including liquid crystal polymers with a second melting point of $T_{m2}$ and a glass transition temperature of $T_g$; and
   performing a third heating process to adjust a coefficient of thermal expansion of the second film to 17 ppm/° C. to 20 ppm/° C., wherein the third heating process has a third heating temperature of $T_g$ to $T_{m2}$.

2. The method of claim 1, wherein the second heating temperature of the second heating process is $T_{m1}-30°$ C. to $T_{m1}+10°$ C.

3. The method of claim 1, wherein the second heating process has a heating time of 1 hour to 60 hours.

4. The method of claim 1, wherein the second heating process has a heating rate of 0.1° C./min to 200° C./min.

5. The method of claim 1, wherein the third heating process has a heating time of 1 minute to 180 minutes.

6. The method of claim 1, further comprising:
   after performing the third heating process to heat the second film, performing a fourth heating process to heat the second film, wherein the fourth heating process has a fourth heating temperature of $T_{m2}-40°$ C. to $T_{m2}$.

7. The method of claim 6, wherein the fourth heating process has a heating rate of 0.1° C./minute to 30° C./minute.

8. The method of claim 6, wherein the fourth heating process has a heating time of 10 minutes to 900 minutes.

9. The method of claim 6, wherein a heating rate of the third heating process is higher than a heating rate of the fourth heating process.

10. The method of claim 9, wherein the heating rate of the third heating process is 100° C./min to 200° C./min, and the heating rate of the fourth heating process is 0.1° C./min to 30° C./min.

11. The method of claim 1, wherein the extrusion process has an extrusion temperature between $T_{m1}$ and the first heating temperature of the first heating process.

12. The method of claim 1, wherein the liquid crystal oligomers are thermotropic liquid crystal oligomers.

13. The method of claim 1, wherein the liquid crystal oligomers are synthesized from a composition including at least one of aromatic dicarboxylic acids and alicyclic dicarboxylic acids and at least one of aromatic diols, alicyclic diols, and aliphatic diols.

14. The method of claim 1, wherein the liquid crystal oligomers are synthesized from a composition including at least one of aromatic hydroxycarboxylic acids.

15. The method of claim 1, wherein the liquid crystal oligomers are synthesized from a composition including at least one of aromatic dicarboxylic acids and alicyclic dicarboxylic acids, at least one of aromatic diols, alicyclic diols, and aliphatic diols, and at least one of aromatic hydroxycarboxylic acids.

16. The method of claim 1, wherein the second heating process has a heating rate of 100° C./min to 200° C./min.

17. The method of claim 1, wherein the liquid crystal oligomers have a weight average molecular weight of 2900 to 10000.

18. The method of claim 1, wherein the liquid crystal oligomers have a weight average molecular weight of 2900 to 8000.

19. The method of claim 1, wherein the liquid crystal oligomers have the average degree of 10 to 50 and a weight average molecular weight of 2900 to 10000.

20. The method of claim 1, wherein a heating rate of the third heating process is 100° C./min to 200° C./min.

* * * * *